United States Patent [19]

Bömer et al.

[11] Patent Number: 4,914,159

[45] Date of Patent: Apr. 3, 1990

[54] OPTICALLY ACTIVE (METH)ACRYLAMIDES, A PROCESS FOR THEIR PREPARATION, AND THEIR USE FOR RACEMATE RESOLUTION

[75] Inventors: Bruno Bömer, Bergisch Gladbach; Rolf Grosser; Ulrich Schwartz, both of Leverkusen; Dieter Arlt; Karl-Erwin Piejko, both of Cologne, all of Fed. Rep. of Germany

[73] Assignee: Bayer Aktiengesellschaft, Leverkusen, Fed. Rep. of Germany

[21] Appl. No.: 162,529

[22] Filed: Mar. 1, 1988

[30] Foreign Application Priority Data

Mar. 4, 1987 [DE] Fed. Rep. of Germany ....... 3706890

[51] Int. Cl.$^4$ .................. C07B 57/00; G01N 30/48
[52] U.S. Cl. ................. 525/328.2; 525/342; 526/279; 526/305
[58] Field of Search .............. 526/279, 305; 525/328.2, 342

[56] References Cited

U.S. PATENT DOCUMENTS 4,554,323 11/1985 Yuki et al. .................... 525/911
4,619,970 10/1986 Okamoto et al. ............... 525/342

FOREIGN PATENT DOCUMENTS 2500523 7/1976 Fed. Rep. of Germany .
3532356-A 3/1987 Fed. Rep. of Germany .

Primary Examiner—Joseph L. Schofer
Assistant Examiner—T. MacDonald, Jr.
Attorney, Agent, or Firm—Sprung Horn Kramer & Woods

[57] ABSTRACT

The invention relates to optically active homo- and copolymers made from optically active (meth)acrylamides, the polymers being immobilized on silica gel, a process for their preparation, and their use as adsorbents, in particular as the stationary phase for chromatographic racemate resolution.

8 Claims, No Drawings

OPTICALLY ACTIVE (METH)ACRYLAMIDES, A PROCESS FOR THEIR PREPARATION, AND THEIR USE FOR RACEMATE RESOLUTION

The invention relates to optically active homo- and copolymers made from optically active (meth)acrylamides, the polymers being immobilized on silica gel, a process for their preparation, and their use as adsorbents, in particular as the stationary phase for chromatographic racemate resolution.

The resolution of racemic mixtures into the antipodes represents a considerable problem in preparative chemistry. Chromatographic resolution methods using optically active adsorbents as the stationary phase are becoming increasingly important for this purpose. However, results hitherto have not been very satisfactory.

Thus, the resolution effect of the optically active adsorbents disclosed by DE-OS (German Published Specification) 2,500,523 on racemates of certain classes of substances is in some cases so slight that the industrial applicability of such a racemate resolution is clearly limited.

Polymers which are immobilized on silica gel are known. Thus, EP-A-0,155,627 describes the preparation of silica gels to which optically active polymers are covalently bound, and the use of these silica gels for chromatographic resolution of some (specific) racemates. The optically active polymers employed are here polyamino acids, polysaccharides, polysaccharide derivatives and synthetic polymers which have molecular asymmetry in the main chain. Polymers having chiral side groups were not used.

G. Blaschke et. al., Angew. Chemis 98, 808 (1986) describes the preparation of silica gel-bound optically active polyamides made from monomers of the general formula

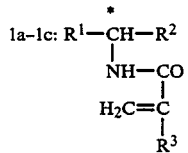

(1) a: $R^1 = C_6H_5CH_2$, $R^2 = CO_2C_2H_5$, $R^3 = H$;
b: $R^1 = C_6H_5$, $R^2 = R^3 = CH_3$;
c: $R^1 = c\text{-}C_6H_{11}$, $R^2 = R^3 = CH_3$ and their use for chromatographic resolution of some chiral medicaments.

Japanese Application J 61,162-750 A describes fillers for racemate resolution which are obtained by reacting silica gel with a copolymer made from an optically active (meth)acrylamide of the formula 2 and a polymerizable silylating agent of the formula 3

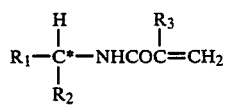

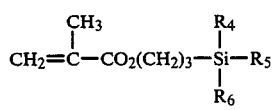

in which formulae are $R_1$ = phenyl, 1- or 2-naphthyl or phenyl which is substituted by a lower alkyl group,
$R_2$ = lower alkyl
$R_3$ = H or methyl and
$R_4$, $R_5$ and $R_6$ may in each case be alkyl, alkoxy, hydroxyl or halogen groups, whereby at least one of the groups must be alkoxy or halogen.

Analogously, conjugates of silica gels are copolymers made from optically active monomers of the formula 4 and polymerizable silylating agents of the formula 3 are described in Japanese Application 61,162-751 A.

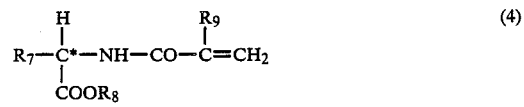

$R_7$ = phenyl, benzyl, 1- or 2-naphthyl, 2-naphthylmethyl, 2-indolylmethyl, cyclohexyl-methyl, lower alkyl-substituted phenyl, carboalkoxy, halogen or hydroxyl
$R_8$ = lower alkyl, and $R_9$ = H or methyl.

The fillers are suitable for resolution of various racemates and of atropisomers.

The invention relates to silica gel-immobilized, optically active homo- and/or copolymers made from (A) 10–100% by weight, preferably 30–100% by weight, of optically active monomer units of the formula (5)

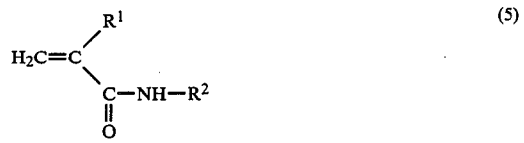

in which
$R^1$ represents hydrogen or methyl, and
$R^2$ represents one of the stereoisomers of the eight possible stereoisomeric forms of each of the optically active radicals of the formulae

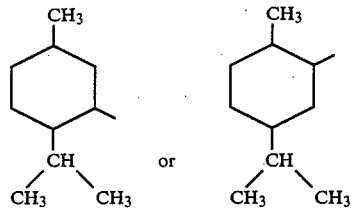

and
(B) 90–0% by weight, preferably 70–0% by weight, of comonomer units from the group comprising $C_1$–$C_8$-alkyl (meth)acrylates, styrene, acrylonitrile, (meth)acrylamide, and nitrogen-substituted (meth)acrylamides.

Particularly preferred polymers are those which comprise exclusively component A.

In addition, it is possible to use 0.1–50, preferably 0.5–25, mol.-%, relative to components A and B, of a comonomer unit which can covalently bond to silica gel or carries a functional group which makes possible covalent linking to silica gel (component C).

Preferred compounds of component A are those in which
$R^1$ represents hydrogen or methyl, and $R^2$ represents a stereoisomer of the eight possible stereoisomeric forms of the optically active radical of the structural formula

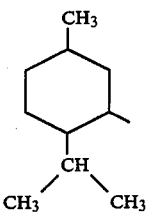

As component A, particular preference is given to l-menthyl(meth)acrylamide, d-menthyl(meth)acrylamide and d-neomenthyl(meth)acrylamide.

The monomers of component A are obtained by reacting optically active amines of the formula (6)

 (6)

in which $R^2$ has the abovementioned meaning, or the acid-addition products thereof, with acrylic acid derivatives of the formula (7)

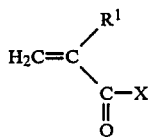 (7)

in which X represents a leaving group, and $R^1$ has the abovementioned meaning, if appropriate in the presence of a base, in inert organic solvents.

Leaving groups which may be mentioned are: halogen, in particular chlorine or bromine, or a group of the formula $OR^3$ in which $R^3$ represents a $C_1$-$C_4$-alkyl group or a

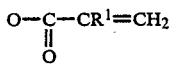

group. In addition, asymmetrical acid anhydrides may alternatively be employed.

The acrylic acid derivatives of the formula 3 used as starting materials are known (Beilsteins Handbuch der organischen Chemie [Beilstein's Handbook of Organic Chemistry], Volume 2, 3rd supplement, page 1293; Volume 2, main work, page 400).

The optically active amines of the formula 2 used as starting materials are known or can be prepared by known methods (E. Beckmann, Liebigs Ann. Chem. 250, 322 ff (1889), H. C. Brown, P. C. Garg, J. Am. Chem. Soc. 83, 2952 (1961), F. Tutin, F. S. Kipping, J. Chem. Soc. London 85, 65–78 (1904), J. Read, Chem. Rev. 7, 1 (1930), H. Feltkamp, F. Koch and Tran Nhut Thanh, Liebigs Ann. Chem. 707, 78 (1967)).

Suitable acid-addition compounds of the amines used are salts of these amines with inorganic or organic acids. Preference is given to mineral acids, such as, for example, hydrochloric acid, hydrobromic acid, sulphuric acid or phosphoric acid, or organic acids, such as acetic acid, methanesulphonic acid, ethanesulphonic acid, benzenesulphonic acid or toluenesulphonic acid.

Suitable solvents are all inert organic solvents. Preference is given to hydrocarbons, such as, for example, benzene, toluene, xylene or mineral oil fractions, or halogenated hydrocarbons, such as, for example, di-, tri- or tetrachloromethane, dichloroethane or trichloroethylene.

Suitable bases are the conventional inorganic and organic bases. Preference is given to alkali metal hydroxides or alkaline-earth metal hydroxides, such as, for example, sodium hydroxide, potassium hydroxide, lithium hydroxide, calcium hydroxide or barium hydroxide, alkali metal carbonates or alkaline-earth metal carbonates, such as, for example, sodium carbonate or potassium carbonate, alkali metal alcoholates, such as, for example, sodium ethanolate, potassium ethanolate, sodium methanolate or potassium methanolate, or amines, such as, for example, triethylamine, pyridine or morpholine.

The reaction temperature can be varied within a relatively wide range. In general, the reaction is carried out in a range from $-20°$ C. to $+100°$ C., preferably from $-10°$ C. to $+60°$ C.

Comonomers of component C which may be mentioned as examples are: polymerizable silylating agents, such as the compounds of the formula 3, vinyltrichlorosilane or vinyltrialkoxysilanes; hydroxyl group-containing monomers, such as hydroxyalkyl (meth)acrylates or glycerol monomethacrylate; epoxy group-containing monomers, such as glycidyl (meth)acrylate; isocyanate group-containing monomers, such as 2-isocyanatoethyl methacrylate or 4-isocyanatostyrene; 2- or 4-isothiocyanatophenyl methacrylate; (meth)acrylyl chloride or (meth)acrylic anhydride, and carboxyl group-containing monomers, such as (meth)acrylic acid, itaconic acid or maleic acid. The monomers containing linking groups are copolymerized in amounts such that, on average, at least one functional group is introduced per polymer chain. In general, between 0.1 and 50 mol.-%, preferably 0.5 and 25 mol.-% (particularly preferably 1–10 mol.-%) of these comonomers are employed.

The silica gel-immobilized, optically active polymers or copolymers according to the invention which contain at least 10% by weight of monomer units of the general formula 5 can be prepared by three synthetic routes.

(A) Introduction of covalently bound polymerization-active double bonds into silica gel and polymerization or copolymerization of the optically active (meth)acrylamide in the presence of this modified silica gel. In this case, the optically active polymer is covalently linked to the silica gel by copolymerization.

(B) Preparation of soluble copolymers made from the (meth)acrylamides of the formula 5 and monomers having functional groups which can either react directly with silica gel or an appropriately modified silica gel or can be covalently linked to silica gel or functionalized silica gel with the aid of a polyfunctional coupling agent.

(C) Polymerization or copolymerization of the (meth)acrylamides of the formula 5 in the presence of unmodified, porous silica gels, immobilization of the (co)polymers very probably being achieved by coiling of the polymer chains in the silica gel structure.

The silica gels used are the silica gel grades which are conventionally used for chromatographic purposes. Their grain size can vary between 1 μm and 10 mm, preferably between 1 and 500 μm. Porous materials having average pore diameters of 50–50,000 Å are preferably employed. The amount of immobilized optically active polymer is 0.2 to 100% by weight, preferably 1–50% by weight, relative to silica gel.

In addition to unmodified silica gels which contain Si—OH groups, silica gels can also be employed into which other functional groups, such as, for example, R—OH, amino, diol or carboxyl groups, have been introduced by known processes.

Synthetic route A

In accordance with synthetic route A, silica gel which has been modified by alcohol or diol groups can be esterified, for example, by methods which are known per se using acrylyl chloride, methacrylyl chloride, acrylic anhydride or methacrylic anhydride in the presence of tertiary amines. The optically active (meth)acrylamides of the formula 5 are then polymerized or copolymerized in the presence of the silica gel which has thus been modified by (meth)acrylate groups. The polymerization can be carried out in suitable solvents, such as (cyclo)-aliphatic hydrocarbons, aromatic hydrocarbons, halogenated hydrocarbons or carboxylates, such as ethyl acetate or butyl acetate. Initiators which can be used are azo initiators such as azoisobutyronitrile, peroxides, such as benzoyl peroxide or dilauroyl peroxide, peresters, such as tert.-butyl perpivalate or tert.-butyl per 2-ethylhexanoate, or percarbonates, such as diisopropyl or dicyclohexyl peroxydicarbonate.

The polymerization temperature and polymerization duration depends on the type of the initiator employed and the desired degree of reaction of the monomer.

In this procedure, the (meth)acrylamide monomer copolymerizes with the (meth)acrylate groups which are covalently bound to the silica gel, and an optionally active poly(meth)acrylamide which is covalently bound to the silica gel matrix is obtained.

When the desired degree of reaction is reached, the polymerization is terminated by cooling and/or addition of a free-radical inhibitor, and the polymer-modified silica gel is washed vigorously with good solvents for the monomer and the non-bound polymer. The content of bound polymer can easily be determined via the nitrogen content of the silica gel conjugate.

Analogous results are obtained when an amino group-modified silica gel (amino phase) is reacted with (meth)acrylyl chloride or (meth)acrylic anhyddride, and the (meth)acrylamide group-modified silica gel thus obtained is copolymerized with the optically active (meth)acrylamide monomer.

A further procedure comprises reacting an unmodified silica gel with a silylating agent which contains a polymerizable double bond and subsequently copolymerizing the product of this reaction with the optically active (meth)acrylamide monomer. The following may be mentioned as suitable silylating agents having polymerizable double-bonds: ω-methacryloyloxypropyltrimethoxysilane, vinyltrichlorosilane, vinyltrimethoxysilane, vinyltriethoxysilane and vinylmethyldiethoxysilane.

Synthetic route B

Linking in accordance with synthetic route B is possible, for example, in the following ways:

The optically active (meth)acrylamide monomer of the formula 5 is copolymerized with a copolymerizable silylating agent and, if appropriate, with further non-optically active comonomers. Copolymerizable silylating agents which can be used are, for example, ω-methacryloyloxypropyl-trimethoxysilane, vinyltrichlorosilane, vinyltrimethoxysilane or vinyltriethoxysilane.

A further process in accordance with synthetic route B comprises reacting a copolymer made from optically active (meth)acrylamide of the formula 5 and glycidyl (meth)acrylate with a modified silica gel containing amino groups or carboxyl groups.

In addition, optically active copolymers containing isocyanate groups, for example made from isocyanatoethyl methacrylate or isocyanatostyrene, can be reacted with silica gel or with hydroxyl or amino group-containing silica gels.

Copolymers containing 2- or 4-isothiocyanatophenyl methacrylate can be reacted with amino group-containing silica gels to form thiourea bonds.

Furthermore, copolymers made from optically active (meth)acrylamides and (meth)acrylyl chloride can be bound to hydroxyl or amino group-containing silica gels. Copolymers react analogously with methacrylic anhydride.

Copolymers which contain carboxyl groups and are made from, for example, (meth)acrylic acid or itaconic acid can be linked to amino group-containing silica gels, for example in the presence of carbodiimides.

Synthetic route C

The preparation in accordance with synthetic route C of optically active polymers or copolymers according to the invention which are immobilized on silica gel can be carried out, for example, by suspending an unmodified porous silica gel in a solution which contains an optically active monomer of the formula 5, if appropriate further monomers which do not react with the silica gel, and an initiator for free-radical polymerization, and keeping the suspension initially at room temperature for a few minutes to 24 hours and then warming to the polymerization temperature.

Solvents which can be used are those which dissolve the monomers and the polymer, such as aliphatic, cycloaliphatic, aromatic or chlorinated hydrocarbons or carboxylates, and those which dissolve only the monomers and not the polymer, such as methanol, ethanol, acetonitrile or dimethylformamide. In this route, the monomer or the mixture of monomers may be partly or virtually completely polymerized, depending on the temperature and the duration of heating. The silica gel conjugate is subsequently filtered off under suction, washed vigorously with solvents for the polymer or copolymer and dried.

In a similar fashion, silica gels which have been modified, for example, by alcohol, amino, diol, carboxyl, trimethylsilyl or dimethyloctylsilyl groups can also be reacted in accordance with synthetic route C.

In some cases, the separation efficiency, in particular for relatively polar racemates, can be improved by subsequent silylization of the polymer-silica gel conjugate obtained by all procedures, using a conventional silylating agent, such as trimethylchlorosilane, hexamethyldisilazane or dimethyloctylchlorosilane.

In addition, the invention relates to the use of the immobilized polymers according to the invention for chromatographic resolution of racemic mixtures into the optical antipodes.

In particular, the invention relates to the use of the immobilized polymers according to the invention for chromatographic resolution of active compound racemates into the optical antipodes, such as, for example, derivatized amino acids, β-lactam compounds, pyrethroids, pyrethroidcarboxylic acids, monocyclic or bicyclic terpene derivatives, azole compounds, nitro- or cyanodihydropyridines, dihydropyridinecarboxylic acids, dihydropyridinecarboxylates or dihydropyridinecarboxamides, dihydropyridine lactones or sulphonyl dihydropyridines. The following can be resolved particularly well: dihydropyridine compounds and pyrethroidcarboxylic acids.

Surprisingly, the optically active polymers according to the invention which are immobilized on silica gel have a better separation efficiency than those which are known from the prior art. Thus, in the resolution of the racemate of 5-ethyl 1,4-dihydro-2,6-dimethyl-4-(2-trifluoromethylphenyl)-3,5-di-carboxylate on adsorbent 4b according to the invention, the enantioselectivity is $\alpha = 1.90$ and the chromatographic resolution $R = 3.27$, compared with $\alpha = 1.08$ and $R = 0.50$ in the case of the adsorbent of comparison example A. No resolution ($\alpha = 1.0$) is achieved in the case of comparison example B.

Furthermore, the polymers which have been immobilized according to the invention also have a good separation efficiency in the case of resolution of relatively large amounts of racemic mixtures, which is of great advantage for industrial application.

The resolution of racemates into the enantiomers using the polymers which have been immobilized according to the invention is advantageously carried out under high-performance chromatographic (HPLC) conditions. The method of working in the enantiomer resolution by HPLC is known to those skilled in the art. The columns which are usually used are preferably in accordance with the dry-packing method for materials having a particle diameter of greater than 20 μm, and are wet for materials having a particle diameter of less than 20 μm, and are packed in the form of suspensions by the viscosity method or "balanced density method". Mobile phases which can be used for the elution are all organic solvents or solvent mixtures which are not aggressive towards the polymer or the silica gel matrix. The composition of the mobile phase can be selected and optimized in a conventional fashion depending on the type and property of the racemate to be resolved.

The separation efficiency of the polymers which are immobilized according to the invention is characterized for some racemates using the capacity ratio $k'_1$ and $k'_2$, the enantioselectivity $\alpha$ and the chromatographic resolution R, these chromatographic parameters being defined as follows:

$$\text{Capacity ratio } k'_{1(2)} = \frac{t_{1(2)} - t_0}{t_0}$$

$$\text{Enantioselectivity } \alpha = \frac{k'_2}{k'_1}$$

$$\text{Chromatographic resolution } R = \frac{2(t_2 - t_1)}{w_1 + w_2}$$

$t_0$ = Column time delay $t_{1(2)}$ = Retention time for the first enantiomer 1to be eluted or the enantiomer 2 which is eluted later $w_{1(2)}$ = Base width of peak 1 or peak 2

I. PREPARATION OF (METH)ACRYLAMIDES

EXAMPLE 1

Preparation of l-menthylmethacrylamide 194 g (1.86 mol) of methacrylyl chloride are added dropwise over the course of 3 hours while stirring to 356 g (1.86 mol) of l-menthylamine hydrochloride and 376 g (3.71 mol) of triethylamine in 1.6 l of dichloromethane at 0° C. The mixture is stirred for a further 2 hours with warming at room temperature. The precipitated triethylamine hydrochloride is filtered off under suction and washed with a little dichloromethane. The combined organic phases are washed twice with aqueous sodium chloride solution, dried over magnesium sulphate and evaporated on a rotary evaporator. The product is recrystallized from ethyl acetate or methanol/water, or, after addition of a little 2,2'-methylene-bis-(4-methyl-6-tert.-butylphenol distilled at a high vacuum at 140°-143° C.

Yield: 376 g (90% of theory).
Melting point: 79°-80° C.
Optical rotation: $(\alpha)_D^{20} = -87.1°$ (c=1, CHCl$_3$).

EXAMPLE 2

Preparation of d-neomenthylmethacrylamide 104.5 g (1 mol) of methacrylyl chloride are added dropwise to 191.7 g (1 mol) of d-neomenthylamine hydrochloride and 212.5 g (2.1 mol) of triethylamine in 780 ml of dichloromethane at room temperature. The mixture is stirred for a further 12 hours while warming at room temperature. The mixture is washed three times with aqueous sodium chloride solution, and the organic phase is dried over magnesium sulphate and evaporated on a rotary evaporator. The product is recrystallized from ethyl acetate.

Yield: 194.5 g (87% of theory).
Melting point: 111°-112° C.
Optical rotation: $(\alpha)_D^{20} = +51.5°$ (C=1, CH$_2$Cl$_2$).

EXAMPLE 3

Preparation of l-menthylacrylamide 90.51 g (1 mol) of acrylyl chloride are added dropwise over the course of 3 hours while stirring to 155.3 g (1 mol) of l-menthylamine and 101.2 g (1 mol) of triethylamine in 400 ml of dichloromethane at 0° C. The mixture is stirred for a further 12 hours while warming at room temperature. The mixture is washed three times with aqueous sodium chloride solution, and the organic phase is dried over magnesium sulphate and evaporated on a rotary evaporator. The product is recrystallized from acetonitrile.

Yield: 184.2 g (88% of theory).
Melting point: 136°-137° C.
Optical rotation: $(\alpha)_D^{20} = -85.7°$ (C=1, CHCl$_3$).

II. PREPARATION OF POLYMERS WHICH ARE IMMOBILIZED ON SILICA GEL

EXAMPLE 4

(a) 5 g of silica gel diol phase, average grain size 5 μm, are suspended in 120 ml of analytical grade dioxane under N$_2$ with exclusion of moisture. 3.2 ml of methacrylic anhydride and 2.5 ml of analytical grade triethylamine are then added. The mixture is stirred at room temperature for 1 hour and allowed to stand at room temperature for 24 hours. The silica gel is then filtered off under suction through a glass frit (G4) and washed by stirring three times, in each case for 30 minutes, in 100 ml of dioxane, sucking dry thoroughly between washings. The product is dried at room temperature in an oil-pump vacuum.

Yield: 4.8 g.
Analysis: C=8.3%, H=1.9%.
Analysis of the starting diol: C=7.7%, H=1.5%.

(b) 3.0 g of the esterified diol phase of (4a), 9.0 g of 1-menthylacrylamide and 30 mg of azobisisobutyronitrile are dissolved or suspended in 50 ml of toluene. The batch is freed from oxygen and warmed to an internal temperature of 80° C. for 15 minutes while stirring. 250 mg of 2,6-di-tert.-butyl-4-methylphenol in 12 ml of toluene are then added, and the mixture is cooled rapidly. The silica gel is filtered off under suction, washed with toluene, washed by stirring in each case for 30 minutes with 50 ml of toluene, 50 ml of dioxane, 50 ml of cyclohexane and 50 ml of isopropanol, in each case filtering off under suction between washings. After drying in an oil-pump vacuum at room temperature, 3.2 g of modified silica gel are obtained. Nitrogen content=0.9%≙13.4% by weight of poly-1-menthylacrylamide.

EXAMPLE 5

3.0 g of the esterified silica gel diol phase of Example 4a, 9.0 g d-menthylacrylamide and 30 mg of azobisisobutyronitrile are dissolved or suspended in 50 ml of 3-toluene and polymerised and washed out according to the process of Example 4b. 3.25 g of modified silica gel having a nitrogen content of 1.1%, corresponding to 16.4% by weight of bound poly-d-menthacrylamide, are obtained.

EXAMPLE 6

3.0 g of the esterified silica gel diol phase of Example 4a, 9.0 g 1-menthylacrylamide and 30 mg of azobisisobutyronitrile are dissolved or suspended in 50 ml of 3-toluene and polymerised and washed out according to the process of Example 4b. 2.85 g of modified silica gel having a nitrogen content of 0.4%, corresponding to 6.3% by weight of bound poly-1-menthylmethacrylamide, are obtained.

EXAMPLE 7

Example 6 is repeated with 9.0 g d-neomenthylacrylamide instead of 1-menthylmethacrylamide, 3.0 g modified silica gel having a nitrogen content of 0.4%, corresponding to 6.0% by weight of bound poly-d-neomenthylacrylamide, are obtained.

EXAMPLE 8

(a) 20 g of silica gel amino phase, average particle diameter 10 μm, are suspended in 480 ml of analytical grade dioxane under N$_2$ with exclusion of moisture. After 12.5 ml of methacrylic anhydride and 10 ml of analytical grade triethylamine have been added, the mixture is stirred at room temperature for 1 hour and then allowed to stand at room temperature for 24 hours, stirring occasionally. The silica gel is washed with dioxane analogously to Example 4a and dried.
Yield: =19.9 g.
Nitrogen content: =1.0%.

(b) 3.0 g of the silica gel methacrylamide phase of 8a, 9.0 g of 1-menthylacrylamide and 30 mg of azobisisobutyronitrile are dissolved or suspended in 50 ml of toluene, and the mixture is polymerized and washed in accordance with the process of Example 4b. 3.15 g of modified silica gel having a nitrogen content of 1.7%, corresponding to 10.4% by weight of bound poly-1-menthylacrylamide, are obtained.

EXAMPLE 9

(a) 5 g of unmodified silica gel which has been dried for 2 hours at 180° C. and a pressure of <1 mbar, 1.0 g of γ-methacryloyloxypropyltrimethoxysilane, 10 mg of hydroquinone and 20 ml of dry toluene are mixed, the mixture is stirred at room temperature for 1 hour, and the toluene is then removed on a rotary evaporator in a water-pump vacuum at a bath temperature of 60° C. The residue is warmed at 130° C. for 5 hours under atmospheric pressure with exclusion of moisture. The silica gel is subsequently washed by stirring, in each case for 20 minutes, 3 times with 40 ml of toluene, twice with 40 ml of isopropanol and once with 40 ml of acetone, in each case filtering off under suction between washing. After drying at room temperature in an oil-pump vacuum, 5.25 g of silylated silica gel having a carbon content of 6.9%, corresponding to about 13.8% by weight of bound silylating agent, are obtained.

(b) 3.0 g of the silylated silica gel of 9a, 9.0 g of 1-menthylacrylamide and 30 mg of azoisobutyronitrile are polymerized in 50 ml of toluene by the process of Example 4b and washed. 3.1 g of modified silica gel having a nitrogen content of 0.3%, corresponding to 4.5% by weight of bound poly-1-menthylacrylamide, are obtained.

EXAMPLE 10

(a) 28.5 g of 1-menthylacrylamide, 1.5 g of γ-methacryloyloxypropyltrimethoxysilane and 100 mg of azoisobutyronitrile are dissolved in 150 ml of toluene. The batch is freed from oxygen and warmed at 80° C. for 8 hours under nitrogen.

(b) 3.5 g of silica gel which had been dried, 3 ml of the copolymer solution prepared under 10(a), 12 ml of toluene and 0.1 ml of analytical grade pyridine are stirred for 1 hour at 40° C., 1 hour at 60° C., 1 hour at 80° C. and 14 hours under reflux with exclusion of moisture. 1 ml of hexamethyldisilazane is subsequently added, and the mixture is refluxed for a further 24 hours. The silica gel is filtered off under suction and washed by stirring three times, in each case for 20 minutes in 30 ml of toluene, once in 30 ml of isopropanol and once in 30 ml of acetone, in each case filtering off under suction between washings. After drying at room temperature in an oil-pump vacuum, 3.65 g of modified silica gel having a nitrogen content of 0.6%, corresponding to about 9% by weight of bound poly-1-menthylacrylamide copolymer, are obtained.

EXAMPLE 11

(a) 27 g of 1-menthylacrylamide, 3 g of γ-methacryloyloxypropyltrimethoxysilane and 100 mg of azoisobutyronitrile are dissolved in 150 ml of toluene, and the mixture is warmed at 80° C. for 8 hours under nitrogen.

(b) 3,5 g silica gel, which had not been dried, 3 ml of the copolymer solution prepared under 11(a) and 12 ml of toluene are stirred for 1 hour at 40° C., 1 hour at 60° C., 2 hours at 80° C. and 17 hours under reflux with exclusion of moisture. After 1 g of hexamethyldisilazane has been added, the batch is stirred at about 105° C. for a further 16 hours. The batch is filtered under suction, and the silica gel is washed by stirring, in each case for 20 minutes, three times with 30 ml of toluene, once with 30 ml of isopropanol and once with 30 ml of acetone, in each case filtering off under suction between washings. After drying in an oil-pump vacuum at room temperature 3.2 g of modified silica gel having a nitrogen content of 0.3%, corresponding to about 5% by weight of bound 1-menthylacrylamide copolymer, are obtained.

EXAMPLE 12

(a) 28.5 g of 1-menthylacrylamide, 1.5 g of γ-methacryloyloxypropyltrimethoxysilane and 100 mg of azoisobutyronitrile are dissolved in 150 ml of dry toluene, and the mixture is polymerized at 60° C. for 16 hours under nitrogen.

(b) Analogously to Example 11(b), 3.0 ml of the copolymer solution prepared under 12(a) are reacted with 3.5 g of silica gel, which has not been dried, subsequently silylated using 1.0 ml of hexamethyldisilazane and washed by stirring vigorously. 3.6 of modified silica gel having a nitrogen content of 0.4%, corresponding to about 6% by weight of bound 1-menthylacrylamide copolymer, are obtained.

EXAMPLE 13

3.0 g of silica gel, average particle diameter 5 μm, 9.0 g of 1-menthylmethacrylamide, and 30 mg of azobisisobutyronitrile are dissolved or suspended in 50 ml of dry toluene. The reaction mixture is carefully freed from oxygen and stirred for 4 hours at room temperature and for 15 minutes at 80° C. The mixture is then cooled rapidly, and 250 mg of 2,6-di-tert.-butyl-4-methylphenol in 12 ml of toluene are added to the batch. The modified silica gel is filtered off under suction through a fine glass frit, washed with toluene, and washed by stirring, in each case for 30 minutes, with 50 ml of toluene, 50 ml of dioxane, 50 ml of cyclohexane and 50 ml of isopropanol, in each case filtering off under suction between washings. After drying at room temperature in an oil-pump vacuum, 3.1 g of modified silica gel are obtained. Nitrogen content=0.7%, corresponding to 11% by weight of bound poly-1-menthylmethacrylamide.

Comparison example A 2.5 g of silica gel diol 5 μm (Merck) which has been esterified using methacrylic anhydride according to the procedure of Blaschke et. al., Angew. Chemie, 98 (1986), 810, are copolymerized with 7.5 g of methacryloyl-cyclohexylethylamide by the specified procedure, and the product is worked up. 2.7 g of modified silica gel having a nitrogen content of 0.7%, corresponding to 9.8% by weight of bound poly-methacryloyl-cyclohexylethylamide, are obtained.

Comparison example B

Analogously to Comparison example A, 2.5 g of diol phase which has been esterified using methacrylic acid are copolymerized with 7.5 g of N-acryloylphenylalanine ethyl ester in 50 ml of toluene, and the product is worked up. 2.75 g of modified silica gel having a nitrogen content of 0.5%, corresponding to 8.8% by weight of bound poly-N-acryloylphenylalanine ethyl ester, are obtained.

III. RESOLUTION EXPERIMENTS

The results of chromatographic resolution experiments using various racemates on adsorbents described under II. are shown below. Analytical columns of length 25 cm and internal diameter 4 mm were used for the experiments. The mobile phase rate was in each case 1 ml/min.

A. using adsorbent from Example 4b

EXAMPLE 14

Methyl (±)-1,4-dihydro-2,6-dimethyl-5-nitro-4-(2-trifluoromethylphenyl)-pyridine-3-carboxylate
Eluent=n-heptane/dioxane (3/2)
$k'_1=3.45$
$\alpha=1.14$

EXAMPLE 15

5-Ethyl (±)-1,4-dihydro-2,6-dimethyl-4-(2-trifluoromethylphenyl)pyridine-3,5-dicarboxylate
Eluent=n-heptane/dioxane (1/1)
$k'_1=0.80$
$\alpha=1.90$
$R=3.27$

EXAMPLE 16

5-Methyl (±)-1,4-dihydro-2,6-dimethyl-4-(2-nitrophenyl)pyridine-3,5-dicarboxylate
Eluent=n-heptane/THF (3/2)
$k'_1=4.58$
$\alpha=1.26$

EXAMPLE 17

(±)-1,4-dihydro-2,6-dimethyl-5-nitro-4-(2-trifluoromethylphenyl)pyridine-3-carboxylic acid
Eluent=n-heptane/THF (3/2)
$k'_1=4.68$
$\alpha=1.38$

EXAMPLE 18

(±)-Z-cis-2,2-dimethyl-3-[2-chloro-2-(4-chlorophenyl)vinyl]cyclopropanecarboxylic acid
Eluent=n-heptane/ethyl acetate (1/1)
$k'_1=0.93$
$\alpha=1.10$

B. using adsorbent from Example 6

EXAMPLE 19

Methyl (±)-1,4-dihydro-2,6-dimethyl-5-nitro-4-(2-trifluoromethylphenyl)-pyridine-3-carboxylate
Eluent=n-heptane/THF (3/2)
$k'_1=11.1$
$\alpha=1.04$

EXAMPLE 20

5-Ethyl (±)-1,4-dihydro-2,6-dimethyl-4-(2-nitrophenyl)pyridine-3,5-dicarboxylate
Eluent=n-heptane/dioxane (3/1)
$k'_1=2.22$
$\alpha=1.23$

EXAMPLE 21

(±)-Z-cis-2,2-dimethyl-3-[2-chloro-2-(4-chlorophenyl)vinyl]cyclopropanecarboxylic acid
Eluent=n-heptane/ethyl acetate (1/1)
$k'_1=0.68$
$\alpha=1.06$

C. using adsorbent from Example 8b

EXAMPLE 22

5-Ethyl (±)-1,4-dihydro-2,6-dimethyl-4-(2-trifluoromethylphenyl)pyridine-3,5-dicarboxylate
Eluent=n-heptane/THF (3/2)
$k'_1=4.75$ D. using adsorbent from Example 9b

EXAMPLE 23

Methyl (±)-1,4-dihydro-2,6-dimethyl-5-nitro-4-(2-trifluoromethylphenyl)-pyridine-3-carboxylate
Eluent=n-heptane/dioxane (3/1)
$k'_1 = 6.40$
$\alpha = 1.08$ E. using adsorbent from Example 10b

EXAMPLE 24

Methyl (±)-1,4-dihydro-2,6-dimethyl-5-nitro-4-(2-trifluoromethylphenyl)-pyridine-3-carboxylate
Eluent=n-heptane/dioxane (3/1)
$k'_1 = 3.62$
$\alpha = 1.12$ F. using adsorbent from Example 11b

EXAMPLE 25

Methyl (±)-1,4-dihydro-2,6-dimethyl-5-nitro-4-(2-trifluoromethylphenyl)-pyridine-3-carboxylate
Eluent=n-heptane/dioxane (3/1)
$k'_1 = 2.90$
$\alpha = 1.17$ G. using adsorbent from Example 12b

EXAMPLE 26

Methyl (±)-1,4-dihydro-2,6-dimethyl-5-nitro-4-(2-trifluoromethylphenyl)-pyridine-3-carboxylate
Eluent=n-heptane/dioxane (3/1)
$k'_1 = 2.4$
$\alpha = 1.10$ H. using adsorbent from Comparison example A

EXAMPLE 27

5-Ethyl (±)-1,4-dihydro-2,6-dimethyl-4-(2-trifluoromethylphenyl)pyridine-3,5-dicarboxylate
Eluent=n-heptane/dioxane (7/3)
$k'_1 = 5.23$
$\alpha = 1.08$
$R = 0.50$ I. using adsorbent from Comparison example B

EXAMPLE 28

5-Ethyl (±)-1,4-dihydro-2,6-dimethyl-4-(2-trifluoromethylphenyl)pyridine-3,5-dicarboxylate
Eluent=n-heptane/dioxane (1/1)
$k'_1 = 1.15$
$\alpha = 1.0$
$R = 0$

What is claimed is:

1. A silica gel-immobilized, optically active (co)polymer made from
   (a) 10–100% by weight of an optically active monomer unit of the formula $$H_2C=C\begin{matrix}R^1\\C-NH-R^2\\\|\\O\end{matrix}$$

in which
R$^1$ is hydrogen or methyl, and
R$^2$ is one of the stereoisomers of the eight possible stereoisomeric forms of each of the optically active radicals of the formulae

[structures: menthyl and neomenthyl groups with CH$_3$ substituents]

and
(B) 90–0% by weight of a monomer unit of the group comprising C$_1$–C$_8$-alkyl (meth)acrylates, styrene, acrylonitrile, (meth)acrylamide and nitrogen-substituted (meth)acrylamides.

2. The silica gel-immobilized (co)polymer of claim 1, in which the component A is present in an amount of 30–100% by weight and component B in an amount of 70–0% by weight.

3. The silica gel-immobilized (co)polymer of claim 1, wherein a further monomer unit which can bond covalently to silica gel or carries a functional group which makes possible covalent linking to silica gel is present in an amount of 0.1–50 mol % relative to components A and B.

4. The silica gel-immobilized (co)polymer according to claim 3, where the further monomer unit is present in an amount of 0.5–25 mol %.

5. The silica gel-immobilized (co)polymer according to claim 1, wherein component A is a monomer of the stated formula in which
R$^1$ is hydrogen or methyl, and
R$^2$ is a stereoisomer of the eight possible stereoisomeric forms of the optically active radical of the structural formula

[structure: menthyl group]

6. The silica gel-immobilized (co)polymer of claim 1, wherein component A is l-menthyl(meth)acrylamide, d-menthyl(meth) acrylamide or d-neomenthyl(meth)acrylamide.

7. The silica gel-immobilized polymer of claim 1, wherein the polymer is made exclusively from component A.

8. The silica gel-immobilized (co)polymer of claim 1 wherein the amount of immobilized optically active (co)polymer is 0.2 to 100% by weight relative to the weight of the silica gel.

* * * * *

UNITED STATES PATENT AND TRADEMARK OFFICE
CERTIFICATE OF CORRECTION

PATENT NO. : 4,914,159
DATED : April 3, 1990
INVENTOR(S) : Bruno Bömer, et al

It is certified that error appears in the above-identified patent and that said Letters Patent is hereby corrected as shown below:

Col. 14, line 58  After "A is" delete "1-menthyl" and substitute --1-methyl--

Signed and Sealed this

Twenty-fifth Day of February, 1992

Attest:

HARRY F. MANBECK, JR.

*Attesting Officer*  Commissioner of Patents and Trademarks